United States Patent [19]

Stapleford

[11] 4,267,642
[45] May 19, 1981

[54] ANGLE GAGE MECHANISM

[76] Inventor: Richard C. Stapleford, Miami, Fla.

[21] Appl. No.: 77,967

[22] Filed: Sep. 24, 1979

Related U.S. Application Data

[63] Continuation-in-part of Ser. No. 963,292, Nov. 24, 1978, abandoned.

[51] Int. Cl.$^3$ .............................................. B43L 7/06
[52] U.S. Cl. ........................................ 33/473; 33/500
[58] Field of Search .................................. 33/418–421, 33/495–500, 473

[56] References Cited

U.S. PATENT DOCUMENTS

| | | | |
|---|---|---|---|
| 1,139,648 | 5/1915 | Demmer | 33/419 |
| 1,398,243 | 11/1921 | Rosskopf | 33/419 |
| 1,478,629 | 12/1923 | Bartlett | 33/485 |
| 1,908,518 | 5/1933 | Lee | 33/451 |
| 2,113,524 | 4/1938 | Wolfe | 33/419 |
| 3,358,372 | 12/1967 | Johnson | 33/473 |

*Primary Examiner*—Charles E. Phillips

*Attorney, Agent, or Firm*—Jesus Sanchelima

[57] ABSTRACT

An angle gage mechanism is disclosed for use in measuring angles of surfaces in a workpiece usually requiring more than one conventional tool at the present time. This invention is capable of performing the most used functions of at least five conventional tools, to wit, solid square, bevel protractor, combination square, rule and bevel. It also includes a vernier for added accuracy and a plurality of pre-set angles that can be readily selected by the user.

The invention comprises a frame with a cylindrical hole housing a cylindrical spindle having means for readily locking said spindle at predetermined angles with respect to the frame and means for frictionally locking said spindle at any angle with respect to the frame. A slot in said frame aligned with a partial slot in the spindle receive a slidable ruler. The frame is further provided with means for frictionally locking said ruler relative to the spindle.

6 Claims, 7 Drawing Figures

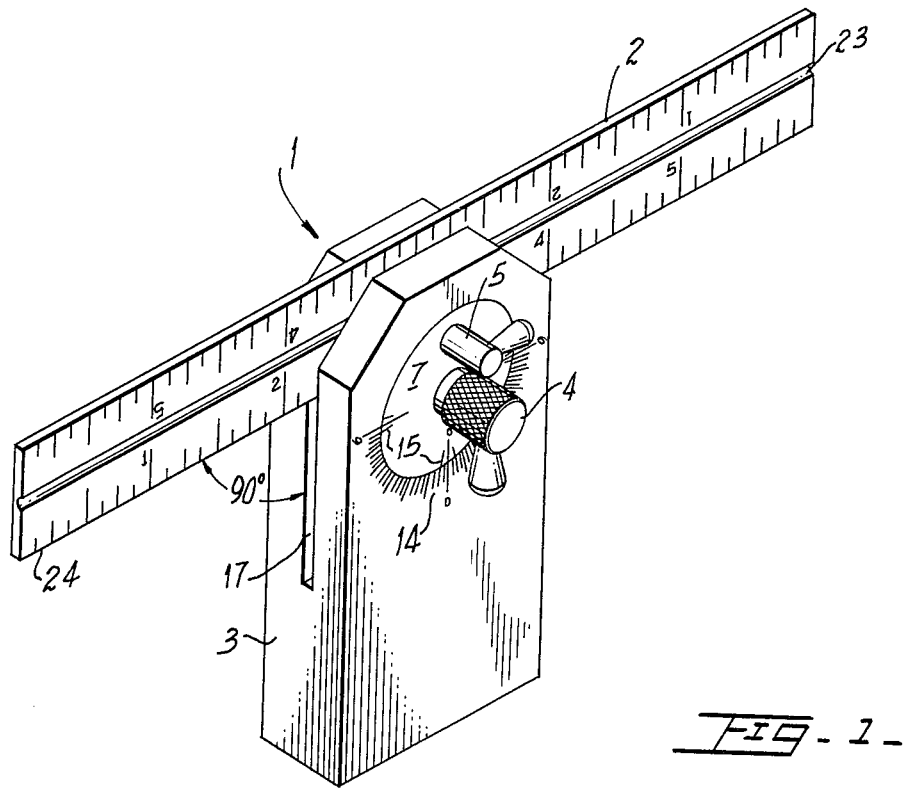
FIG-1
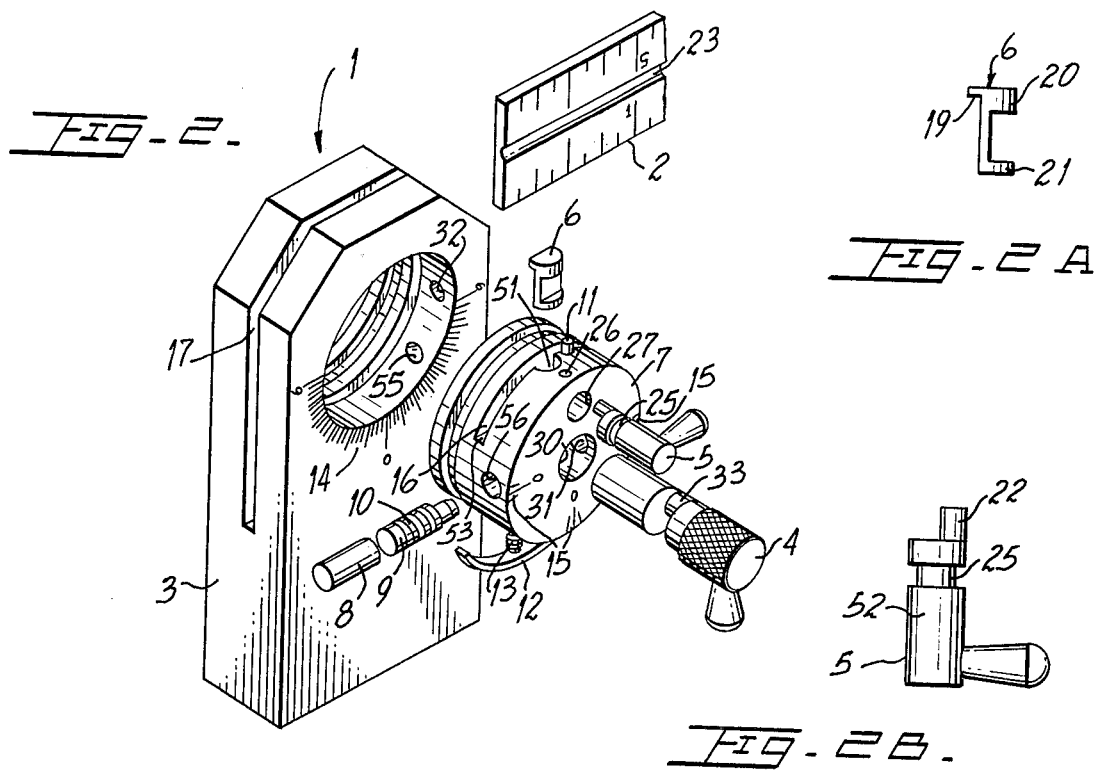
FIG-2
FIG-2A
FIG-2B

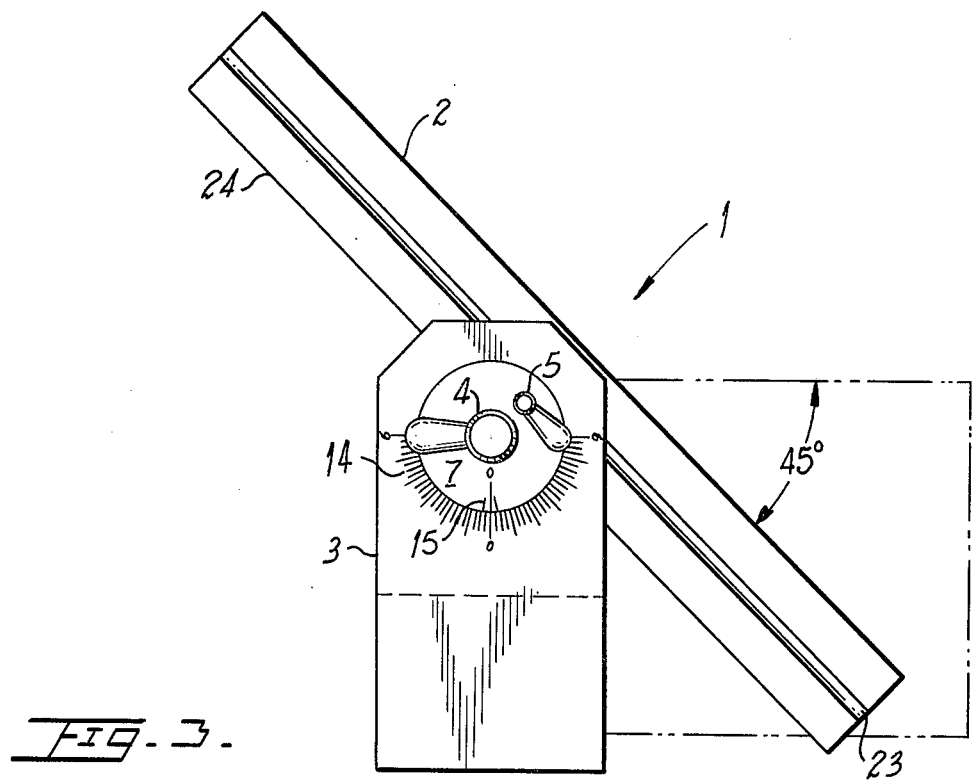
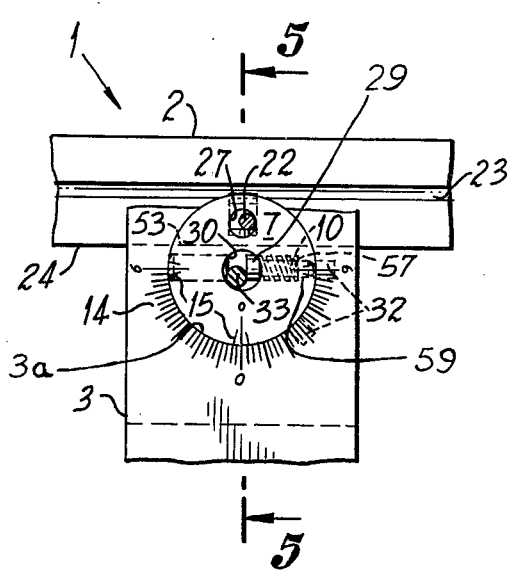
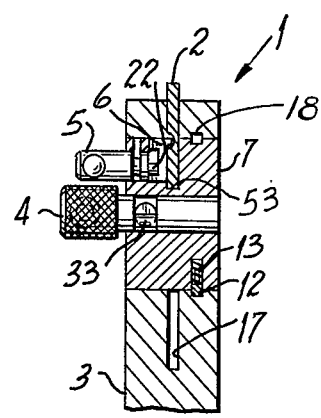

ANGLE GAGE MECHANISM

OTHER RELATED APPLICATIONS

The present application is a continuation-in-part of U.S. application Ser. No. 963,292 filed on November 24, 1978 now abandoned.

BACKGROUND OF THE INVENTION

1. Field of the Invention

The present invention relates to a measuring tool that combines the most popular functions of at least five conventional tools used in a typical machine shop, inspection station, tool and die shop, precision carpentry shop, or similar shop where the measurement of the angles on a workpiece is frequently performed and it is desirable to combine the accuracy of the measurements with the speed of taking these measurements. With this angle gage mechanism the user can measure angles in remote corners of a workpiece.

2. Discussion of the Prior Art

The closest device found in the prior art is described and claimed by Raymond G. Voss in U.S. Pat. No. 3,672,065 granted on June 27, 1972. This device, however, has a number of limitations, such as requiring alignment of the shank assembly 18 with the center line of check 12 of a vertical drilling machine. Furthermore, Voss' invention is intended to be used with vertical drilling machines only thereby preventing its use by inspectors or other more informal users that need to make a quick measurement. Voss' patent describes a clamping screw that is used to pre-set a given angle. This clamping screw 42 will be set by the user, before using the device, making an approximation with the device's calibration scale 28. In the present invention, these pre-set angles have been calibrated at the time of manufacture and, consequently, the settings are more accurate. Also, the user can select a popular angle with the flip of a lever, without having to look at the calibration scale.

Another device that constitutes part of the prior art is disclosed in U.S. Pat. No. 2,920,392 issued to Martin G. Stromquist. This bevel protractor allows a quicker measurement than Voss' device but it does not have pre-set angle capability. Also, in the present invention the ruler attached thereto slides, making it more flexible for not readily accessible angles. Stromquist's protractor has jaws 23 and 11' that are fixed in length.

Other related inventions have been studied as part of the prior art. None of these inventions anticipates the novel features of the present invention. Also, textbooks and trade magazines available to the applicant and his patent counsel fail to disclose a similar device.

SUMMARY OF THE INVENTION

It is the purpose of the present invention to provide a tool for measuring angles on workpieces without requiring other tools to complement it.

It is also an object of this invention to provide a tool that can measure angles of surfaces inaccessible to conventional tools.

Another object of this invention is to provide a tool with volumetric efficiency without sacrificing accuracy.

Yet another object of the present invention is to provide an inexpensive and simple instrument for measuring the angles of surfaces in a workpiece.

Still another object of this invention is to provide a tool having a plurality of pre-determined angles that can be readily selected by the user.

BRIEF DESCRIPTION OF THE DRAWINGS

FIG. 1 is a view in perspective of the present invention.

FIG. 2 is an exploded view in perspective of the angle gage mechanism. FIG. 2A shows a side view of 6. FIG. 2B is a side view of 5.

FIG. 3 is a front view of this invention illustrating the relative dimensions of the preferred embodiment.

FIG. 4 is a partial front view of the present invention showing the details of the locking means hereinafter described.

FIG. 5 is a side cross section of FIG. 4 along line 5—5.

DESCRIPTION OF THE PREFERRED EMBODIMENT

The angle gage mechanism, generally referred to as 1, is shown in FIG. 1 consists of a frame 3 having a transverse cylindrical hole 3a within which is rotatively received a a cylindrical spindle 7.

Spindle 7, shown in FIG. 2, has a radially-extending partial slot 16 in register with side-to-side slot 17 of frame 3, when the spindle 7 is mounted thereon. Ruler 2 can be slid through frame slot 17 and spindle partial slot 16 freely. Ruler 2 has a longitudinal groove 23 on one of its sides and, in the preferred embodiment, this groove 23 is located in the middle of one of the sides of ruler 2. Ruler locking pin 6 is shown in detail in FIG. 2A having an irregular shape. Pin 6 is removably inserted in radial longitudinal aperture 51 which is adjacent to partial slot 16. The cross-section of aperture 51 is more than a semi-circle and less than a full circle so that pin 6 cannot fall off when ruler 2 is taken out. The only way that pin 6 can be inserted or retrieved in aperture 51 is radially inwardly or outwardly. Ruler locking lever hole 27 meets perpendicularly radial longitudinal aperture 51. Hole 27 houses most of shank 52 of ruler locking lever 5 and it is held in place by ruler locking lever retaining pin 11 which is inserted in ruler locking lever retaining pin hole 26. Hole 26 meets perpendicularly hole 27 which extends parallel to the axis of cylindrical spindle 7. Pin 11 protrudes through the inner wall of hole 27 enough so that it engages with ruler locking retaining groove 25 thereby holding ruler locking lever 5 in place. Shank 52 of lever 5 terminates with an off-center cam 22, as shown in detail in FIG. 2B. When lever 5 is rotated, cam 22 engages lower end 21 of pin 6 pushing it downwardly towards the center of spindle 7. This movement causes protrusion 19 to engage the lower part of the side wall of groove 23, urging ruler 2 towards the center of spindle 7 also. The ruler's lower edge 24 is pressed against the bottom 53 of partial slot 16 thereby frictionally securing said ruler 2 in place.

There are two mechanisms for locking spindle 7 in place. The first one comprises a headed pre-positioning locking pin 9 and pre-positioning pin return helical spring 10 which is circumjacently mounted on said headed pin and constrained at its inner end against the underside of the pin head 29. These two elements are housed inside first radial hole 31 which has an annular shoulder 57 that constrain the outer end of spring 10 so that said pin is normally urged in the withdrawn position with respect to cylindrical spindle hole 3a. Pin 9 and spring 10 are inserted for assembly through second radial hole 56 which has a larger diameter than first radial hole 31, as shown in FIG. 4. Pin 9 is slightly longer than first radial hole 31 as shown in FIG. 4 so that pin 9 protrudes through the inner wall of axial hole 30 in spindle 7 by virtue of the bias of spring 10. Spindle locking lever 4 is inserted inside axial hole 30 and its eccentric shaft 33 activates or pushes pin 9 when the lever 4 is rotated thereby compressing spring 10 and inserting the pin's tip 59 inside first locking cavity 32 which in the preferred embodiment it is positioned so that the ruler 2 is set at 90° with respect to a vertical axis running longitudinally through frame 3. A second locking cavity 55 is shown in FIG. 2 located so that ruler 2 will make a 60° angle with respect to said vertical axis when pin 9 is inserted in this second locking cavity 55. The user will have to bring the ruler 2 and, of course spindle 7, to the approximate 60° and at the same time try to rotate lever 4 until pin 9 penetrates inside cavity 55. The angles of these cavities, 32 and 55, are positioned according to the user's objectives and the number of cavities may be two or more. Radial locking pin 8 is also larger in diameter than the diameter of pre-positioning locking pin head 29 and of the body of pin 9. Therefore, it is impossible for pin 8 to penetrate inside first radial hole 32 by mistake. Pin 8 is housed inside second radial hole 56. Pin 8 is large enough so that it protrudes slightly through the inner wall of axial hole 30 and it is also activated by eccentric shaft 33 when it is rotated in the opposite direction that activates pin 9. Pin 8, when activated, is pushed against the inner wall of cylindrical spindle hole 3a thereby frictionally holding the spindle 7 at any angle. The only limitations in the angle at which spindle 7 (and consequently ruler 2) can be set is determined by the depth of slot 17.

In operation, the user will be able to adjust the ruler 2 slidably through partial slot 16 and also rotate the ruler 2 to any desired angle. The user will then lock the spindle 7 frictionally by activating pin 8 with spindle locking lever 7. Further, if the workpiece needs to be compared to a predetermined angle the user will just lock the spindle 7 in place by activating pin 9.

Spindle 7 is kept in place by protractor spindle retaining split ring 12 which is spring loaded with split ring loading spring 13 which is compressed when spindle 7 is placed inside frame 3, as shown in FIG. 5. The spindle retaining split ring 12 travels around interior peripheral groove 18 within cylindrical spindle hole 3a, thereby preventing any side movement of said spindle 7.

It is believed the foregoing description conveys the best understanding of the objects and advantages of the present invention. The following claims have been drawn to cover all legitimate modifications and adaptations.

What I claim is:

1. An angle gage mechanism to measure angles of surfaces in workpieces comprising, in combination, a frame having a cylindrical hole, said hole including a plurality of radially-extending loking cavities opening into its inner wall and positioned at mutually circumferentially-spaced, predetermined angles, and a longitudinal side slot perpendicular to the axis of said cylindrical hole and extending therethrough, a slidable ruler having a longitudinally-extending groove along one side and capable of being partially inserted in said slot, a cylindrical spindle rotatively received in said spindle hole and having a radially-extending partial slot in register with said side slot of said frame, said cylindrical spindle having a concentric axial cylindrical hole, and first and second radially-extending, diametrically-opposed through holes in communication with said axial hole, a first means for frictionally locking said slidable ruler in place within said radially-extending partial slot of said cylindrical spindle, said first means comprising a radially-extending aperture in said cylindrical spindle, open to the outer periphery thereof and rotatively angularly displaced with respect to said first and second radial holes, a ruler locking pin received in said radially-extending aperture and radially movable ruler for urging said ruler in abutting contact with the bottom surface of said partial slot; a second means including a first locking pin spring biased toward said axial hole and slidable in said first radially-extending hole and actuated at its inner end by eccentric control means carried in said axial hole in said spindle, receivable at its outer end in one at a time, selectively, of said cavities for locking said spindle in place at a predetermined location with respect to said frame; and third means including a second locking pin being of a length greater than the longitudinal dimension of said second radially extending through-hole and being slidable in said second radially-extending hole and actuated at its inner and by said control means carried in said axial hole in said spindle, said second locking pin being abutable at its outer end against the peripheral surface of said spindle hole for frictionally locking said cylindrical spindle with respect to said frame at any angular position with respect thereto.

2. An angle gage mechanism as described in claim 1 wherein said cylindrical spindle further comprises a protractor spindle retaining split ring inserted in a peripheral groove around said cylindrical spindle and a split ring loading spring positioned between said peripheral groove and said protractor spindle retaining split ring in compression state.

3. An angle gage mechanism as described in claim 1 wherein said frame includes a calibration scale around the periphery of said round hole in said frame and said spindle further includes a plurality of vernier calibration scales.

4. An angle gage mechanism as defined in claim 1 wherein said first means further comprises a protrusion at the outer end of said ruler locking pin receivable in said longitudinal groove of said slidable ruler, and manually controlled means mounted on said cylindrical spindle for urging said ruler locking pin in its inward direction in said aperture to carry said slide ruler inwardly to its abutting position with respect to the bottom surface of said radially-extending partial slot of said cylindrical spindle.

5. An angle gage mechanism as defined in claim 1 wherein said second means further comprises a protractor spindle locking lever in said axial center hole in said cylindrical spindle, said protractor spindle locking lever having an eccentric shaft portion in alignment with said first and second radial holes, said first locking pin having a head at its inner end and spring means yieldingly urging said locking pin in abutting relation with respect to said eccentric shaft portion, the outer end of said first locking pin being receivable, selectively, in one at a time of said cylindrical hole locking cavities upon the turning of said protractor spindle locking lever in its axial hole.

6. An angle gage mechanism as defined in claim 5 wherein the inner end of said second locking pin is so positioned and of such length as to be actuated for movement in and out of frictional contact with peripheral wall portions of said cylindrical hole of said frame upon the rotation of said protractor spindle locking lever in the direction opposite to its direction of rotation for actuation of said first locking pin.

* * * * *